United States Patent
Levy et al.

(10) Patent No.: US 12,111,681 B2
(45) Date of Patent: Oct. 8, 2024

(54) NETWORK ADAPTER PROVIDING ISOLATED SELF-CONTAINED TIME SERVICES

(71) Applicant: MELLANOX TECHNOLOGIES, LTD., Yokneam (IL)

(72) Inventors: Itai Levy, Haifa (IL); Dotan David Levi, Kiryat Motzkin (IL); Nir Nitzani, Tel Aviv (IL); Natan Manevich, Ramat Hasharon (IL); Alex Vaynman, Modiin (IL); Ariel Almog, Kohav Yair (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 564 days.

(21) Appl. No.: 17/313,026

(22) Filed: May 6, 2021

(65) Prior Publication Data
US 2022/0357763 A1 Nov. 10, 2022

(51) Int. Cl.
*G06F 1/12* (2006.01)
*G06F 13/20* (2006.01)
*H04L 7/00* (2006.01)

(52) U.S. Cl.
CPC .............. *G06F 1/12* (2013.01); *G06F 13/20* (2013.01); *H04L 7/0012* (2013.01)

(58) Field of Classification Search
CPC ........... H04L 7/0012; G06F 13/20; G06F 1/12
USPC ........................................................ 709/248
See application file for complete search history.

(56) References Cited

U.S. PATENT DOCUMENTS

| | | | |
|---|---|---|---|
| 5,392,421 | A | 2/1995 | Lennartsson |
| 5,402,394 | A | 3/1995 | Turski |
| 5,416,808 | A | 5/1995 | Witsaman et al. |
| 5,491,792 | A | 2/1996 | Grisham et al. |
| 5,564,285 | A | 10/1996 | Jurewicz et al. |
| 5,592,486 | A | 1/1997 | Lo et al. |
| 5,896,524 | A | 4/1999 | Halstead, Jr. et al. |
| 6,055,246 | A | 4/2000 | Jones |
| 6,084,856 | A | 7/2000 | Simmons et al. |
| 6,144,714 | A | 11/2000 | Bleiweiss et al. |

(Continued)

FOREIGN PATENT DOCUMENTS

| | | |
|---|---|---|
| CN | 101059825 A | 10/2007 |
| CN | 101388741 A | 3/2009 |

(Continued)

OTHER PUBLICATIONS

U.S. Appl. No. 17/549,949 Office Action dated Mar. 30, 2023.
(Continued)

*Primary Examiner* — Christopher M Crutchfield
*Assistant Examiner* — Jean F Voltaire
(74) *Attorney, Agent, or Firm* — MEITAR PATENTS LTD.

(57) ABSTRACT

A network adapter includes a network port for communicating with a communication network, a hardware clock, and circuitry. The circuitry is coupled to receive from the communication network, via the network port, one or more time-protocol packets that convey a network time used for synchronizing network devices in the communication network, to align the hardware clock to the network time conveyed in the time-protocol packets, and to make the network time available to one or more time-service consumers running in a host served by the network adapter.

21 Claims, 2 Drawing Sheets

(56) References Cited

U.S. PATENT DOCUMENTS

| | | |
|---|---|---|
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,164,759 B1 | 12/2018 | Volpe |
| 10,320,646 B2 | 6/2019 | Mirsky et al. |
| 10,637,776 B2 | 4/2020 | Iwasaki |
| 10,727,966 B1 | 7/2020 | Izenberg et al. |
| 10,908,635 B1 | 2/2021 | Ranganathan et al. |
| 11,379,334 B1 | 7/2022 | Srinivasan et al. |
| 11,388,263 B2 | 7/2022 | Levi et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0268183 A1 | 12/2005 | Barmettler |
| 2006/0109376 A1 | 5/2006 | Chaffee et al. |
| 2006/0171496 A1 | 8/2006 | Nakamuta et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0167443 A1 | 7/2009 | Liu et al. |
| 2009/0257458 A1 | 10/2009 | Cui et al. |
| 2010/0280858 A1 | 11/2010 | Bugenhagen |
| 2011/0110360 A1 | 5/2011 | Fenwick et al. |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinelli et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0110211 A1 | 4/2016 | Kames |
| 2016/0112182 A1* | 4/2016 | Karnes ............... G06F 1/14 |
| | | 375/362 |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0220300 A1* | 7/2019 | Rosenboom ......... G06F 9/5077 |
| 2019/0265997 A1* | 8/2019 | Merrill ............... G06F 9/52 |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0044657 A1 | 2/2020 | Pi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1* | 12/2020 | Thampi ............... H04J 3/0667 |
| 2021/0006344 A1 | 1/2021 | Chen et al. |
| 2021/0141413 A1 | 5/2021 | Levi et al. |
| 2021/0175991 A1 | 6/2021 | Neugeboren |
| 2021/0218431 A1 | 7/2021 | Narayanan et al. |
| 2021/0297230 A1 | 9/2021 | Dror et al. |
| 2021/0318978 A1 | 10/2021 | Hsung |
| 2021/0409031 A1 | 12/2021 | Ranganathan et al. |
| 2022/0066978 A1 | 3/2022 | Mishra et al. |
| 2022/0239549 A1 | 7/2022 | Zhao et al. |

(56) References Cited

U.S. PATENT DOCUMENTS

| | | |
|---|---|---|
| 2022/0261032 A1 | 8/2022 | Bateni |
| 2022/0342086 A1 | 10/2022 | Yoshida |
| 2023/0076889 A1 | 3/2023 | Rabinovich et al. |

FOREIGN PATENT DOCUMENTS

| | | | |
|---|---|---|---|
| CN | 106817183 | A | 6/2017 |
| CN | 108667547 | A | 10/2018 |
| CN | 108829493 | A | 11/2018 |
| EP | 1215559 | B1 | 9/2007 |
| EP | 2770678 | A1 | 8/2014 |
| JP | 2011091676 | A | 5/2011 |
| WO | 2012007276 | A1 | 1/2012 |
| WO | 2013124782 | A2 | 8/2013 |
| WO | 2013143112 | A1 | 10/2013 |
| WO | 2014029533 | A1 | 2/2014 |
| WO | 2014138936 | A1 | 9/2014 |

OTHER PUBLICATIONS

Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
IPclock, "IEEE 1588 Primer," ip-clock.com, pp. 1-3, May 1, 2017 (downloaded from https://web.archive.org/web/20170501192647/http://ip-clock.com/ieee-1588-primer/).
U.S. Appl. No. 16/900,931 Office Action dated Apr. 28, 2022.
U.S. Appl. No. 16/683,309 Office Action dated Mar. 17, 2022.
U.S. Appl. No. 16/779,611 Office Action dated Mar. 17, 2022.
U.S. Appl. No. 17/120,313 Office Action dated Mar. 28, 2022.
U.S. Appl. No. 17/191,736 Office Action dated Apr. 26, 2022.
EP Application # 21214269 Search Report dated May 2, 2022.
U.S. Appl. No. 17/148,605 Office Action dated May 17, 2022.
U.S. Appl. No. 17/191,736 Advisory Action dated Feb. 16, 2023.
"IEEE Standard for Local and Metropolitan Area Networks—Timing and Synchronization for Time-Sensitive Applications," IEEE Std 802.1AS-2020, IEEE Computer Society, pp. 1-421, year 2020.
EP Application # 22151451.6 Search Report dated Jun. 17, 2022.
U.S. Appl. No. 16/779,611 Office Action dated Jun. 24, 2022.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
U.S. Appl. No. 17/120,313 Office Action dated Aug. 29, 2022.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
ITU-T Standard G.8261/Y.1361, "Timing and synchronization aspects in packet networks", pp. 1-120, Aug. 2019.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377-60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/579,630 Office Action dated Oct. 24, 2022.
U.S. Appl. No. 17/579,630 Office Action dated Jan. 12, 2023.
U.S. Appl. No. 17/670,540 Office Action dated Jan. 18, 2023.
U.S. Appl. No. 17/191,736 Office Action dated Nov. 10, 2022.
U.S. Appl. No. 16/683,309 Office Action dated Sep. 17, 2021.
U.S. Appl. No. 16/920,722 Office Action dated Aug. 12, 2021.
IEEE Standard 1588™—2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
Levi et al., U.S. Appl. No. 16/782,075, filed Feb. 5, 2020.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Levi et al., U.S. Appl. No. 16/799,873, filed Feb. 25, 2020.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Texas Instruments, "LMK05318 Ultra-Low Jitter Network Synchronizer Clock With Two Frequency Domains," Product Folder, pp. 1-86, Dec. 2018.
Ravid et al., U.S. Appl. No. 16/920,772, filed Jul. 6, 2020.
Sela et al., U.S. Appl. No. 16/900,931, filed Jun. 14, 2020.
Levi et al., U.S. Appl. No. 17/120,313, filed Dec. 14, 2020.
Mula et al., U.S. Appl. No. 17/148,605, filed Jan. 14, 2021.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Sattinger et al., U.S. Appl. No. 17/191,736, filed Mar. 4, 2021.
U.S. Appl. No. 18/111,916 Office Action dated Jun. 5, 2024.
CN Application # 202210456108.6 Office Action dated Aug. 30, 2024.

* cited by examiner

NETWORK ADAPTER PROVIDING ISOLATED SELF-CONTAINED TIME SERVICES

FIELD OF THE INVENTION

The present invention relates generally to time synchronization in communication networks, and particularly to network adapters providing time services to hosts.

BACKGROUND OF THE INVENTION

Computer and communication networks may use various schemes and protocols for synchronizing network nodes to a common time-base. One common example of such a protocol is the Precision Time Protocol (PTP) defined in IEEE standards 1588-2002 and 1588-2008, and later versions thereof. PTP is used to synchronize clocks throughout a computer network and may achieve sub-microsecond accuracy.

U.S. Pat. No. 8,370,675 describes a method for clock synchronization which includes computing an offset value between a local clock time of a real-time clock circuit and a reference clock time, and loading the offset value into a register that is associated with the real-time clock circuit. The local clock time is then summed with the value in the register so as to give an adjusted value of the local clock time that is synchronized with the reference clock.

U.S. Patent Application Publication 2020/0162234 describes an apparatus including a shared device in communication with a plurality of computing machines external to the shared device. The shared device includes at least one PTP domain coefficient storage area, the at least one PTP domain coefficient storage area receiving a PTP coefficient from a computing machine having a PTP client, and providing the PTP coefficient to a computing machine not having a PTP client.

SUMMARY OF THE INVENTION

An embodiment of the present invention that is described herein provides a network adapter including a network port for communicating with a communication network, a hardware clock, and circuitry. The circuitry is coupled to receive from the communication network, via the network port, one or more time-protocol packets that convey a network time used for synchronizing network devices in the communication network, to align the hardware clock to the network time conveyed in the time-protocol packets, and to make the network time available to one or more time-service consumers running in a host served by the network adapter.

In some embodiments, the circuitry is coupled to communicate with the host over a peripheral bus, and to make the network time available to the time-service consumers using a peripheral-bus device exposed on the peripheral bus. In an example embodiment, the peripheral-bus device is a read-only bus device that transfers information only unidirectionally from the peripheral bus to the host.

In a disclosed embodiment, the circuitry includes a processor coupled to run software that aligns the hardware clock. In an embodiment, the time-protocol packets comply with a time-synchronization protocol, and the processor is coupled to run a software stack of the time-synchronization protocol, the software stack aligning the hardware clock to the network time.

In another embodiment, the circuitry is coupled to apply to the time-protocol packets timestamps having a defined timestamping accuracy, and the processor is coupled to align the hardware clock with an accuracy that matches the timestamping accuracy. In yet another embodiment, the circuitry is coupled to isolate the time-protocol packets from the host. In still another embodiment, the time-protocol packets comply with a time-synchronization protocol, and the circuitry is coupled to isolate a control plane of the time-synchronization protocol from the host.

In an embodiment, the circuitry is coupled to calculate, based on the received time-protocol packets, one or more corrections that align the hardware clock to the network time, and to apply the calculated corrections to the hardware clock. In an embodiment, the circuitry is coupled to align both a frequency and a time offset of the hardware clock to the network time, so as to make an offset-free value of the network time available to the host. In another embodiment, the circuitry is coupled to make available a value of the network time that is usable by the time-service consumers without translation or conversion.

Typically, the circuitry is further coupled to provide networking services to the host, concurrently with making the network time available to the host.

There is additionally provided, in accordance with an embodiment of the present invention, a compute node including a host and a network adapter. The host includes one or more processors for running one or more time-service consumer processes. The network adapter includes a hardware clock and is coupled to receive, from a communication network, one or more time-protocol packets that convey a network time used for synchronizing network devices in the communication network, to align the hardware clock to the network time conveyed in the time-protocol packets, and to make the network time available to the time-service consumer processes running in the host.

In various embodiments, the time-service consumer processes running in the host are of at least one process type selected from a group of types consisting of a user application, a Virtual Machine (VM), and operating-system process and a container.

In some embodiments, the host and the network adapter are coupled to communicate with one another over a peripheral bus, and the host is coupled to obtain the network time from the network adapter using a peripheral-bus device that is queried for the network time by the time-service consumer processes running in the host. In an embodiment, the peripheral-bus device is a read-only bus device that transfers information only unidirectionally from the peripheral bus to the host.

There is also provided, in accordance with an embodiment of the present invention, a method in a network adapter. The method includes receiving in the network adapter, from a communication network, one or more time-protocol packets that convey a network time used for synchronizing network devices in the communication network. A hardware clock in the network adapter is aligned to the network time conveyed in the time-protocol packets. The network time is made available to one or more time-service consumers running in a host served by the network adapter.

There is further provided, in accordance with an embodiment of the present invention, a method is a compute node. The method includes running one or more time-service consumer processes in one or more processors of a host. In a network adapter that serves the host, one or more time-protocol packets, which convey a network time used for synchronizing network devices in a communication network, are received from the communication network. A hardware clock in the network adapter is aligned to the network time conveyed in the time-protocol packets. The network time is made available to the time-service consumer processes running in the host.

The present invention will be more fully understood from the following detailed description of the embodiments thereof, taken together with the drawings in which:

DETAILED DESCRIPTION OF EMBODIMENTS

Overview

Figure 1:
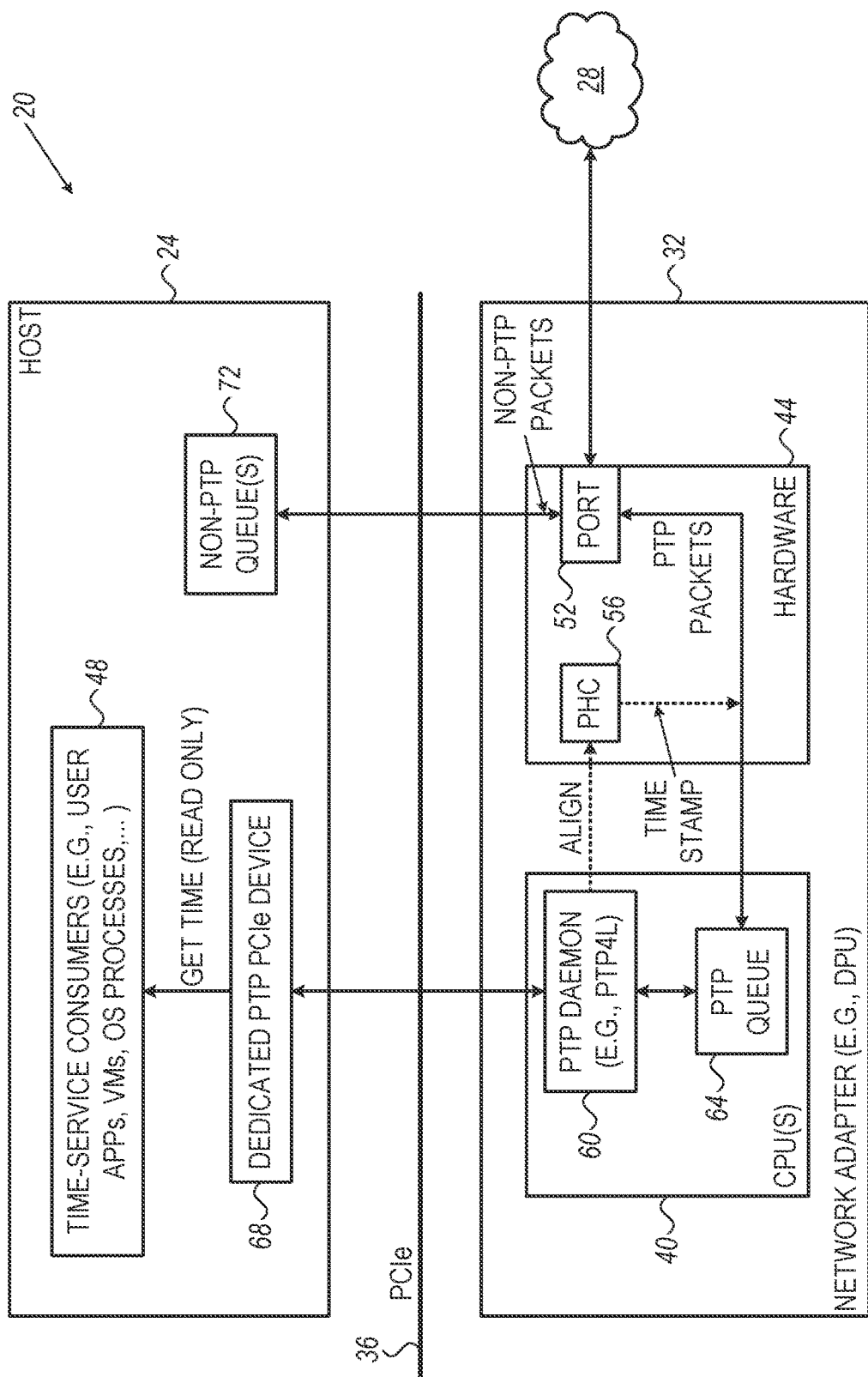
FIG. 1 is a block diagram that schematically illustrates a computing system, comprising a network adapter that provides an isolated, self-contained time service to a host, in accordance with an embodiment of the present invention.

Embodiments of the present invention that are described herein provide improved network adapters that, in addition to connecting their hosts to a network, provide the hosts with an accurate time service.

In the present context, the term "time service" refers to a service in which a network adapter provides a host with the current network time. The term "network time" refers to a common time base that is used for synchronizing network devices (e.g., compute nodes, network adapters, network switches and the like) in the network to one another. The network devices typically synchronize to the network time by exchanging time-protocol packets of a suitable time-synchronization protocol, such as PTP.

In some embodiments, the network adapter communicates with the host over a peripheral bus, e.g., a Peripheral Component Interconnect express (PCIe) bus. The host comprises one or more processors that may run various "time-service consumers," e.g., user applications, Virtual Machines (VMs), operating system processes, or any other suitable software that uses the network time. At least some of the time-service consumers may require a highly accurate indication of the network time, to carry out various time-sensitive applications. In order to provide the time service to the time-service consumers running in the host, the network adapter comprises the following:

A hardware clock (e.g., PTP Hardware Clock—PHC) that tracks the network time.
  A processor that runs a software stack of the time-synchronization protocol. The software stack typically receives time-protocol packets (e.g., PTP packets) from the network, and aligns ("disciplines") the hardware clock to the network time based on the received time-protocol packets. In some embodiments, the aligned ("disciplined") network time is made available to the time-service consumers using one or more dedicated devices (e.g., PCIe devices, also referred to as PCIe interfaces) that are exposed to the host over the peripheral bus. In other embodiments, other mechanisms for providing the network time can be used, e.g., a shared memory.

When using the disclosed technique, the host is typically completely isolated from the control plane of the time-synchronization protocol. Time-protocol packets arriving from the network are handled by the software stack of the time-synchronization protocol that runs in the network adapter, and typically do not reach the host. The interaction of the host with the time service is typically limited to querying the dedicated device for the current network time. The time-service consumers are not required to support the time-synchronization protocol (e.g., PTP). The time-service consumers need not even be aware of (i.e., have information as to) the fact that such a protocol is being used.

The isolated time service solution described herein provides considerable advantages. For example, implementation of the time service is agnostic to the hardware and software configuration of the host, the host operating system and the software the host may run. As such, configuration changes in the host, e.g., hardware or software upgrades, have no effect on the time service. The accuracy of the time service remains constant, regardless of the load conditions and the hardware and software configuration or topology of the host.

In addition, since the time service is implemented entirely within the network adapter, the software stack of the time-synchronization protocol can be designed and optimized for the specific network adapter hardware. The network adapter can be provided "out of the box" with pre-configured time-synchronization protocol hardware and software. For example, the software stack can be optimized for the precision of the specific hardware clock used in the network adapter. In an example embodiment, the software stack may avoid aligning the hardware clock with a resolution that is finer than the hardware clock's precision or timestamping resolution (e.g., 400 nSec). Offloading the time-synchronization protocol stack to the network adapter also reduces the computational load of the host.

Moreover, isolating the host from the time service provides a high degree of security. Since the host is exposed only to a dedicated device having specific functionality over the peripheral bus, the "surface of attack" that might be exploited by malware is very small. Vulnerability to attack is further reduced by the fact that the exposed device is typically a read-only device, meaning that the flow of time-related information is unidirectional from the network adapter to the host.

The disclosed solution is useful in a wide variety of applications and use-cases. One typical example is a server in a "bare metal cloud" data center, in which a client ("tenant") is provided with full access to the host. Another typical example is a server in a multi-tenant cloud-based data center (sometimes referred to as "virtualization cloud"). In both use-cases, the service provider has little or no control over the end-user's instance (which may comprise the entire host, a VM, a container, or any other suitable entity). A time service that is isolated and self-contained within the network adapter is highly effective in such environments.

When using the disclosed technique in a cloud architecture, the time service can be provided to a tenant in a transparent manner that is easy to integrate with the tenant's system, regardless of the operating system and software used by the tenant. At the same time, the entire time-synchronization protocol infrastructure and configuration remain hidden from the tenant, thereby isolating and protecting the cloud provider network from possible attacks originating from the tenant's software. The cloud provider may also serve multiple isolated tenants (in a bare-metal configuration or otherwise) using a single time-synchronization protocol infrastructure.

Provisioning of Accurate Time Services by Network Adapter

FIG. 1 is a block diagram that schematically illustrates a computing system 20, in accordance with an embodiment of the present invention. System 20 comprises a network adapter 32 that provides an isolated, self-contained time service to a host 24 using techniques that are described in detail herein. In various embodiments, host 24 may comprise any suitable type of computer, e.g., a server in a data center or a computer in a High-Performance Computing (HPC) cluster.

Network adapter 32 may comprise any suitable type of network adapter. In the present example, network adapter 32 is a high-functionality device that comprises one or more integral CPUs 40 and processing hardware 44. Such a network adapter is also referred to as a Data Processing Unit (DPU) or "Smart Network Interface Controller (Smart-NIC)". In alternative embodiments, network adapter 32 may comprise, for example, an Ethernet NIC, an Infiniband™ Host Channel Adapter (HCA), a network-enabled Graphics Processing Unit (GPU), a Field-Programmable Gate Array (FPGA), or any other suitable type of device capable of network communication. The description that follows refers to a DPU, by way of example.

Host 24 and DPU 32 communicate with one another over a peripheral bus 36. In the present example bus 36 comprises a Peripheral Component Interconnect express (PCIe) bus. Alternatively, any other suitable type of peripheral bus can be used.

DPU 32 connects host 24 to a packet network 28. Depending on the applicable use-case, network 28 may comprise, for example, a Local-Area Network (LAN) of a data center, a Wide-Area Network (WAN) such as the Internet, or any other suitable type of network or combination of networks. Communication over network 28 may be performed using any suitable communication protocol, e.g., Ethernet or Infiniband. DPU 32 comprises one or more network ports 52 (a single port in the example of FIG. 1) for connecting to network 28.

In some embodiments, DPU 32 is synchronized to the network time of network 28. Typically, the network devices of network 28 synchronize to the network time by exchanging time-protocol packets of a suitable time-synchronization protocol. In the present example the time-synchronization protocol is PTP, and the time-protocol packets are referred to as PTP packets. Alternatively, the time-synchronization protocol may comprise, for example, Network Time Protocol (NTP) or Synchronous Ethernet (SyncE). (Aspects of synchronization using SyncE are addressed, for example, in U.S. patent application Ser. No. 16/920,772, filed Jul. 6, 2020, which is assigned to the assignee of the present patent application and whose disclosure is incorporated herein by reference.) The description that follows refers to PTP, by way of example.

In the embodiment of FIG. 1, DPU 32 synchronizes to the network time using (i) a PTP Hardware Clock (PHC) 56 that is part of hardware 44, and (ii) a PTP daemon 60 running on CPUs 40. PHC 56 tracks the network time, and is used, for example, for timestamping inbound PTP packets (PTP packets received from network 28 by DPU 32) and outbound PTP packets (PTP packets sent by the DPU to the network). PTP daemon 60 implements the PTP software stack. Among other tasks, PTP daemon 60 aligns ("disciplines") PHC 56 to the network time based on the incoming PTP packets.

When the operating system of CPUs 40 is Linux, PTP daemon 60 may comprise, for example, the PTP4L software. Alternatively, PTP daemon 60 may comprise any other suitable software that carries out the protocol stack of the time-synchronization protocol being used. In one example embodiment, CPUs 40 run a Linux operating system, and the PTP4L software runs in a "hardware aware" mode for high stability and accuracy. In an embodiment, CPUs 40 also maintain a PTP queue 64 for queuing incoming PTP packets that are pending for processing by PTP daemon 60.

In some embodiments, DPU 32 provides an isolated, self-contained time service to host 24 using a dedicated PTP device 68 that is exposed on PCIe bus 36. The present example refers to a single PTP device 68. In alternative embodiments, multiple PTP devices 68 may be exposed on the PCIe bus.

Various time-service consumers 48 that run on host 24 (e.g., user applications, virtual machines or operating system processes) can request and receive the current network time from PTP device 68. Time-service consumers 48 may interact with device 68 directly, or indirectly, e.g., via a suitable Application Programming Interface (API). Host 24 comprises one or more processors (e.g., CPUs—not shown in the figure). Time-service consumers 48 may run on any of the processors in the host. For simplicity, software that runs on any of the processors of host 24 are sometimes referred to as "running in host 24".

As part of the "isolation" provided by the disclosed techniques, in some embodiments the PTP packets that arrive from network 28 typically remain confined within DPU 32 and do not reach host 24. By contrast, non-PTP packets arriving from the network are delivered to host 24 and are queued in one or more non-PTP queues 72 (as opposed to PTP queue 64 that is part of DPU 32).

The configurations of network adapter (e.g., DPU) 32 and host 24 shown in FIG. 1 are example configurations that are depicted purely for the sake of conceptual clarity. Any other suitable configurations can be used in alternative embodiments. For example, the embodiment of FIG. 1 shows a single host 24 served by network adapter 32. In alternative embodiments, the same network adapter (e.g., DPU) 32 may provide time services to multiple hosts 24 in parallel by exposing PTP device 68 to the multiple hosts. In an embodiment, device 68 may be exposed to each host using a different name. Suitable logic in DPU 32 distinguishes between requests to the device arriving from different hosts. In one example, different time offsets (e.g., corresponding to the local time in different time zones) may be added to the network time provided to different hosts. Aspects of clock synchronization in multi-host scenarios, which can be combined with the disclosed technique, are described in U.S. patent application Ser. No. 16/779,611, filed Feb. 2, 2020, whose disclosure is incorporated herein by reference.

In various embodiments, the synchronized hardware PTP clock function may be exposed to time-service consumers 48 on host 24 in various ways. In some embodiments, host 24 operating systems may run native software drivers to identify the synchronized PTP function over the network adapter's PCIe bus 36, and expose the synchronized PTP function as a system PTP device 68. In other embodiments, some host operating systems may require suitable middleware, which would provide an API for the time-service consumers to interact with the synchronized PTP function over the PCIe bus.

The embodiment of FIG. 1 describes a certain partitioning of functionality ("division of labor") between software and hardware, or between general-purpose processing circuitry (CPUs 40 in the present example) and special-purpose network processing circuitry (hardware 44 in the present example). In alternative embodiments, any other suitable partitioning can be used, including software-only or hardware-only implementations. In the present context, CPUs 40 and hardware 44 (excluding port 52) are jointly referred to as "circuitry" that carries out the techniques described herein. In alternative embodiments, the disclosed techniques can be carried out using any other suitable circuitry. Host 24 and network adapter 32 are also referred to jointly as a compute node.

The various elements of network adapter (e.g., DPU) 32 and host 24 may be implemented using suitable hardware, such as in one or more Application-Specific Integrated Circuits (ASIC) or Field-Programmable Gate Arrays (FPGA), using software, or using a combination of hardware and software elements. In some embodiments, any of CPUs 40 of network adapter 32 and/or any CPU of host 24 may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
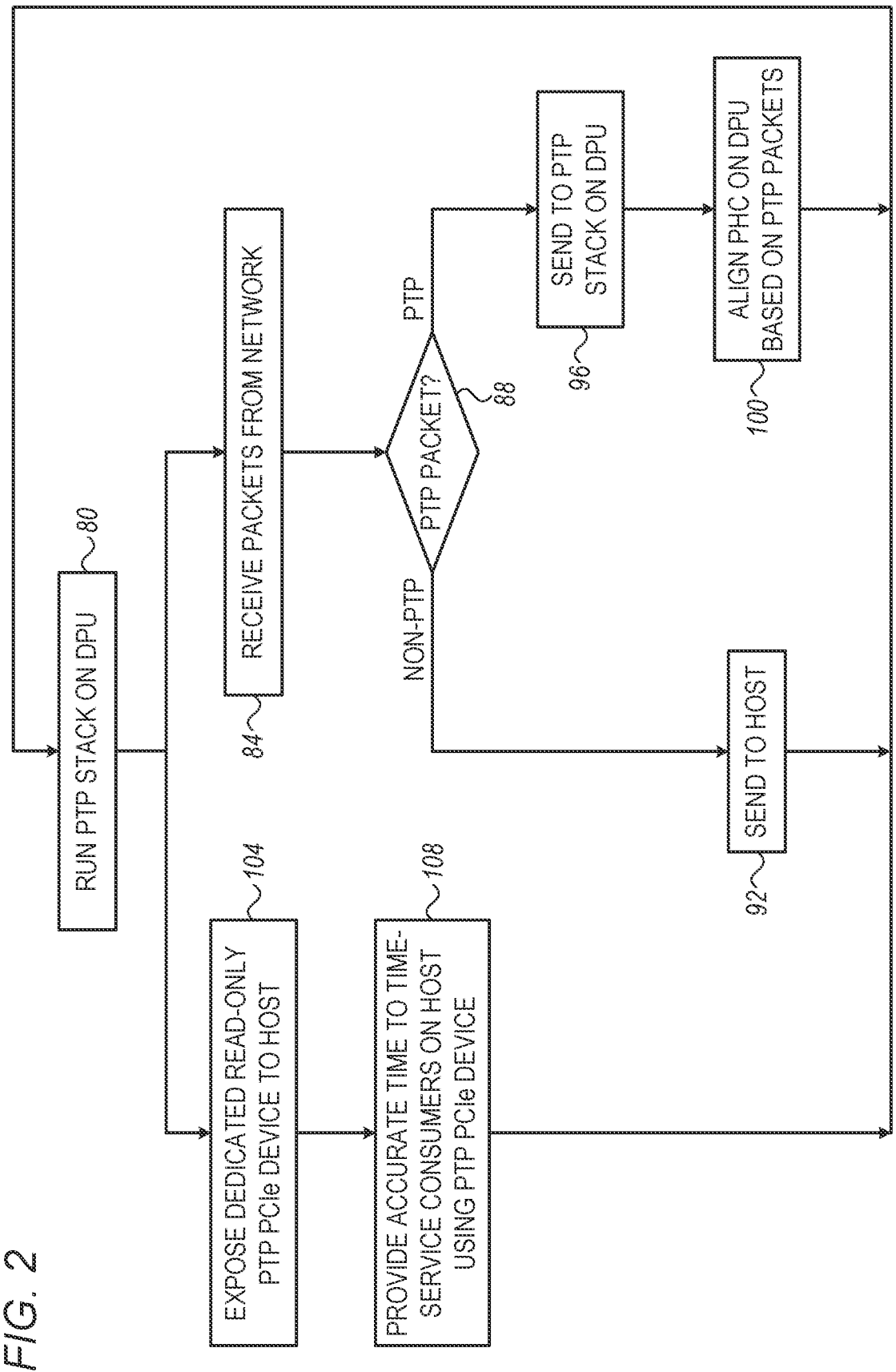
FIG. 2 is a flow chart that schematically illustrates a method for providing an isolated, self-contained time service by a network adapter, in accordance with an embodiment of the present invention.

FIG. 2 is a flow chart that schematically illustrates a method for providing an isolated, self-contained time service by DPU 32, in accordance with an embodiment of the present invention. The flow comprises two branches that are typically performed in parallel. In the first branch, corresponding to steps 84-100, DPU 32 receives packets from the network, including PTP packets, and uses the PTP packets to align PHC 56 to the network time. In the second branch, corresponding to steps 104-108, DPU 32 uses the network time to provide a time service to time-service consumers running in host 24.

At a protocol stack running step 80, CPUs 40 of DPU 32 run PTP daemon 60, which implements the PTP software stack. At a packet reception step 84, DPU 32 receives packets from network 28 via port 52. At a checking step 88, hardware 44 checks classifies the received packets into PTP packets and non-PTP packets. At a non-PTP forwarding step 92, hardware 44 of DPU 32 sends any non-PTP packet via PCIe bus 36 to queue(s) 72 of host 24. At a PTP forwarding step 96, hardware 44 sends any PTP packet to PTP queue 64, for processing by PTP daemon 60. The PTP packets are typically timestamped by PHC 56 with the current network time, before being forwarded to queue 64.

At an alignment step 100, PTP daemon 60 aligns PHC 56 based on the timestamped PTP packets. PTP daemon 60 typically calculates, based on the received PTP packets, corrections that align PHC 56 to the network time, and applies the calculated corrections to the PHC. The method loops back to step 80 above.

In parallel with steps 84-100, PTP daemon 60 exposes dedicated PTP device 68 to host 24 over PCIe bus 36, at a device exposing step 104. At a time-service provisioning step 108, any time-service consumers running in host 24 may query device 68 and thus obtain the current network time. The method loops back to step 80 above.

In some embodiments, the alignment of PHC 56 (at step 100) comprises both a frequency alignment and a time-offset alignment. With such an alignment of PHC 56, PTP device 68 can expose an offset-free value of the current network time to time-service consumers 48, obviating the need for any translations or conversions in host 24.

In various embodiments, time-service consumers 48 may use the network time information in any suitable way and for any suitable purpose. The host may use time-sensitive semantics and operations, such as, for example, 'send packet X at 8:00 am' or 'forward packet Y to queue Z based on the arrival time of the packet'. Techniques of this sort are addressed, for example, in U.S. Patent Application Publication 2020/0162234, cited above, and in U.S. patent application Ser. No. 16/782,075, filed Feb. 2, 2020, which is assigned to the assignee of the present patent application and whose disclosure is incorporated herein by reference.

In an embodiment, host 24 may use the time service to synchronize its own clock to PHC 56 of DPU 32 (and thus to the network time) without having to implement any of the PTP stack. Any time-service consumer 48 (e.g., a VM) may similarly synchronize its clock to the network time. Multiple different software entities in host 24 can be synchronized in this manner. Aspects of such synchronization are also addresses in U.S. Patent Application Publication 2020/0162234, cited above, whose disclosure is incorporated herein by reference. Linux methods and services, such as PHC2SYS, can use the time service to synchronize to the network time with little or no software overhead.

Although the embodiments described herein mainly address various general cloud computing architectures, the methods and systems described herein can also be used in other applications, such as in industry-specific cloud architectures (such as cloud architectures oriented at telecom, media & entertainment, finance cloud and the like). The architecture in question may be implemented in the core or at the edge of the network. Further alternatively, the disclosed techniques can be used in standard bare-metal architectures having no cloud/virtualization, which may be used for various industry-oriented applications. In one example, an enterprise customer may use the disclosed technique to run time-sensitive applications on a bare-metal operating system that does not support any time-protocol software stack.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a hardware clock fitted in a network adapter; and
circuitry, which is contained within the network adapter and is to:
communicate with a host over a peripheral bus; receive, from a communication network, one or more time-protocol packets of a time-synchronization protocol, the time-protocol packets conveying a network time used for synchronizing network devices in the communication network;
run, within the network adapter, a software stack of the time-synchronization protocol, wherein running the software stack includes aligning the hardware clock to the network time conveyed in the time-protocol packets; and
make the network time available over the peripheral bus to one or more time-service consumers running in the host.

2. The apparatus according to claim 1, wherein the circuitry is to make the network time available to the time-service consumers using a peripheral-bus device exposed on the peripheral bus.

3. The apparatus according to claim 2, wherein the peripheral-bus device is a read-only bus device that transfers information only unidirectionally from the peripheral bus to the host.

4. The apparatus according to claim 1, wherein the circuitry comprises a processor to run software that aligns the hardware clock.

5. The apparatus according to claim 1, wherein the circuitry is to apply to the time-protocol packets timestamps having a defined timestamping accuracy, and to align the hardware clock with an accuracy that matches the timestamping accuracy.

6. The apparatus according to claim 1, wherein the circuitry is to isolate the time-protocol packets from the host.

7. The apparatus according to claim 1, wherein the circuitry is to isolate a control plane of the time-synchronization protocol from the host.

8. The apparatus according to claim 1, wherein the circuitry is to calculate, based on the received time-protocol packets, one or more corrections that align the hardware clock to the network time, and to apply the calculated corrections to the hardware clock.

9. The apparatus according to claim 1, wherein the circuitry is to align both a frequency and a time offset of the hardware clock to the network time, so as to make an offset-free value of the network time available to the host.

10. The apparatus according to claim 1, wherein the circuitry is to make available a value of the network time that is usable by the time-service consumers without translation or conversion.

11. The apparatus according to claim 1, wherein the circuitry is further to provide networking services to the host, concurrently with making the network time available to the host.

12. A compute node, comprising:
a host, comprising one or more processors for running one or more time-service consumer processes;
a peripheral bus; and
a network adapter, which comprises a hardware clock and which is to:
communicate with the host over the peripheral bus;
receive, from a communication network, one or more time-protocol packets of a time-synchronization protocol, the time-protocol packets conveying a network time used for synchronizing network devices in the communication network;
run, within the network adapter, a software stack of the time-synchronization protocol, wherein running the software stack includes aligning the hardware clock to the network time conveyed in the time-protocol packets; and
make the network time available over the peripheral bus to the time-service consumer processes running in the host.

13. The compute node according to claim 12, wherein the time-service consumer processes running in the host are of at least one process type selected from a group of types consisting of a user application, a Virtual Machine (VM), and operating-system process and a container.

14. The compute node according to claim 12, wherein the host is to obtain the network time from the network adapter using a peripheral-bus device that is queried for the network time by the time-service consumer processes running in the host.

15. The compute node according to claim 14, wherein the peripheral-bus device is a read-only bus device that transfers information only unidirectionally from the peripheral bus to the host.

16. A method in a network adapter, the method comprising:
receiving in the network adapter, from a communication network, one or more time-protocol packets of a time-synchronization protocol, the time-protocol packets conveying a network time used for synchronizing network devices in the communication network;
running, within the network adapter, a software stack of the time-synchronization protocol, including aligning a hardware clock in the network adapter to the network time conveyed in the time-protocol packets; and
making the network time available over a peripheral bus to one or more time-service consumers running in a host served by the network adapter.

17. The method according to claim 16, wherein making the network time available is performed using a peripheral-bus device exposed on the peripheral bus.

18. The method according to claim 17, wherein the peripheral-bus device is a read-only bus device that transfers information only unidirectionally from the peripheral bus to the host.

19. A method is a compute node, the method comprising:
running one or more time-service consumer processes in one or more processors of a host; and
in a network adapter that serves the host:
communicating with the host over a peripheral bus;
receiving, from a communication network, one or more time-protocol packets of a time-synchronization protocol, the time-protocol packets conveying a network time used for synchronizing network devices in the communication network;
running, within the network adapter, a software stack of the time-synchronization protocol, including aligning a hardware clock in the network adapter to the network time conveyed in the time-protocol packets; and
making the network time available over the peripheral bus to the time-service consumer processes running in the host.

20. The method according to claim 19, wherein making the network time available is performed using a peripheral-bus device that is queried for the network time by the time-service consumer processes.

21. The method according to claim 20, wherein the peripheral-bus device is a read-only bus device that transfers information only unidirectionally from the peripheral bus to the host.

* * * * *